(12) United States Patent
Christman et al.

(10) Patent No.: US 7,370,634 B2
(45) Date of Patent: May 13, 2008

(54) INTERNAL COMBUSTION ENGINE SPARK TIMING CONTROL SYSTEM

(75) Inventors: Anthony Christman, Madison Heights, MI (US); Philip Fabien, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 10 days.

(21) Appl. No.: 11/530,693

(22) Filed: Sep. 11, 2006

(65) Prior Publication Data

US 2008/0060615 A1 Mar. 13, 2008

(51) Int. Cl.
*F02P 5/15* (2006.01)

(52) U.S. Cl. ............................. 123/406.29; 123/406.59
(58) Field of Classification Search ........... 123/406.11, 123/406.29, 406.33–406.38, 406.59; 701/110, 701/111
See application file for complete search history.

(56) References Cited

U.S. PATENT DOCUMENTS

| | | | | | |
|---|---|---|---|---|---|
| 4,002,155 A | * | 1/1977 | Harned et al. | ......... | 123/406.39 |
| 4,535,739 A | * | 8/1985 | Kudo et al. | ............ | 123/406.35 |
| 4,599,982 A | * | 7/1986 | Sugiura | .................. | 123/406.37 |
| 4,745,901 A | * | 5/1988 | Reifenberger et al. | . | 123/406.47 |
| 5,347,846 A | | 9/1994 | Kitano | | |
| 5,560,337 A | * | 10/1996 | Bolander et al. | ...... | 123/406.33 |
| 6,360,586 B1 | | 3/2002 | Morishita | | |
| 6,529,817 B2 | | 3/2003 | Tornu | | |
| 6,688,286 B2 | | 2/2004 | Kokubo | | |
| 6,796,289 B2 | | 9/2004 | Uraki | | |
| 7,051,712 B2 | | 5/2006 | Kantschar | | |

* cited by examiner

*Primary Examiner*—Willis R. Wolfe, Jr.

(57) ABSTRACT

A method for controlling spark timing in an internal combustion engine. The method includes determining, in response to a knock sensor mounted to the engine, a spark offset to the scheduled spark timing for the engine at relatively low engine speed which is applied to the scheduled spark timing at relatively high engine speeds. This offset is applied in conjunction with a time-varying spark retardation bias. The offset is removed at a rate proportional to the time varying spark retard bias. The bias increases if either a relatively large torque is demanded from the engine or the engine is at the relatively high speed and relatively high air charge condition; otherwise, the bias is decreased with time.

4 Claims, 5 Drawing Sheets

INTERNAL COMBUSTION ENGINE SPARK TIMING CONTROL SYSTEM

TECHNICAL FIELD

This invention relates to internal engine spark timing control systems.

BACKGROUND

As is known in the art, in a conventional internal combustion engine for automotive vehicles, a fuel and air mixture is provided in correct proportions, usually stoichiometric proportion, and a spark is used for igniting the air/fuel mixture. The spark is timed in relation to the position of the pistons in the engine cylinders to generate maximum torque while avoiding engine knock, which is auto-ignition of the air/fuel mixture occurring ahead of the progressing flame front. The variables that influence the propensity for engine knock include engine speed, manifold pressure, coolant temperature, intake air temperature, ambient pressure, EGR, humidity, dilution, enthalpy of vaporization of the fuel, and fuel octane. The spark timing which delivers maximum torque while avoiding engine knock is based upon the instantaneous values for these variables stored in a look-up table in the memory of a microprocessor, which forms a part of the electronic engine control system.

The engine control system obtains readings from various sensors whose signals are a measure of the engine operating conditions and generates an appropriate address to the look-up table in ROM. The control system then computes the correct spark advance for each cylinder.

Generally, advancing the spark for each cylinder increases the torque until a point at which maximum torque is achieved, termed MBT, minimum spark advance for best torque. At certain operating conditions, the spark cannot be advanced to MBT without encountering engine knock. This is characterized by an abnormally rapid rise in cylinder pressure during combustion. That rapid rise in pressure is followed by pressure oscillations, the frequency of which is specific to a given engine configuration and cylinder dimension.

A relatively low energy level of knock arguably is beneficial to engine performance, but audible knock may result in vehicle operator dissatisfaction, and excessive knock can damage the engine. A typical control strategy will distinguish between acceptable and unacceptable levels of knock. The engine control will advance the spark until the knock level becomes unacceptable. This is determined empirically. At that point, the control system will reduce the spark advance until an acceptable level of knock is achieved.

A control system of this type requires a knock sensor that responds to engine vibration energy and functions in the spectrum of rapid cylinder pressure oscillations. Accurate control of knock permits the engine to be calibrated closer to the optimum ignition timing.

The degree of knock depends upon the amount of energy available and the rate of combustion of the end gas. Factors that have an effect on the degree of knock include cylinder temperature, manifold pressure, residual burned fraction, air/fuel ratio, spark timing, octane, homogeneity of the air/fuel mixture, cylinder geometry, compression ratio, and the amount of end gas, i.e., unburned mixture when auto ignition occurs.

Since many of these variables change from cycle to cycle and from cylinder to cylinder, the level of knock also changes from cycle to cycle and from cylinder to cylinder. Therefore, knock intensity is a random phenomenon. At light knock, the occurrence of knock is random from cycle to cycle and cylinder to cylinder. Any variable that affects the combustion process or changes the mass, pressure, temperature, or composition of the end gas contributes to knock intensity and rate of occurrence. For example, in any given engine, some cylinders run hotter than other cylinders or due to manufacturing tolerances have a higher compression ratio than the average of the cylinders. These factors can cause one cylinder to knock more readily than other engine cylinders.

As is also known in the art, knock detection systems that include audio transducers, such as an accelerometer for converting audio signals indicative of abnormal engine combustion into an output voltage that can be used by a microprocessor in controlling engine timing to eliminate knock. Examples of these prior art devices are described in U.S. Pat. Nos. 5,347,846 and/or 6,529,817. Typically, an accelerometer is coupled to the engine, such acceleration producing a charge proportional to the level of vibration. This signal is analyzed for occurrence of frequency components that indicate that one or more cylinders are knocking. The vibration sensor (e.g., accelerometer) is mounted on the engine in a multi-cylinder internal combustion engine. The signal that is obtained from the transducer is filtered and sampled. The voltage amplitudes of several samples are compared by a comparator circuit. If a sample that is measured at an instant later than a sample measured earlier in the combustion cycle is greater in magnitude by a predetermined amount, it is assumed that auto ignition or knock is occurring and an appropriate signal is distributed to a fuel enrichment control or to a spark retard control, or to both, until the auto ignition is eliminated. In another system, an accelerometer is used to sample a signal that includes a background noise portion and a portion that represents knock. The portion of the signal that represents background noise is used to develop a bias for the gain of a control transistor. A knock threshold detector responds to a predetermined increase in the amplitude of the portion of the signal voltage that represents knock above the value that represents background noise and then develops an output signal that is used by the microprocessor to adjust spark timing or fuel supply.

At high engine speeds, the signal difference between background noise and knock is too small to reliably detect knock. In the past knock sensors have been disabled at these high engine speeds.

SUMMARY

In accordance with the present invention, a method is provided for controlling spark timing in an internal combustion engine. The method includes determining, in response to a knock sensor mounted to the engine, a spark offset to the scheduled spark timing for the engine at relatively low engine speed which is applied to the scheduled spark timing at relatively high engine speeds. This offset is applied in conjunction with a time-varying spark retardation bias. The offset is removed at a rate proportional to the time varying spark retard bias. The bias increases if either a relatively large torque is demanded from the engine or the engine is at the relatively high speed and relatively high air charge condition; otherwise, the bias is decreased with time.

Conventional methods disabled the knock control algorithm at high engine speeds. This was necessary because the algorithm could not reliably detect knock in the presence of increased back ground noise. In order to protect the engine where the knock sensors were disabled the method scheduled a safe spark advance that takes into account the variability of the factors that influence knock, fuel octane, compression ratio, humidity, and manifold pressure to name a few. The resulting "safe" spark advance reduced the power output of the engine.

The time based spark advance/retard strategy takes advantage of a knock control algorithm and incorporates a time based spark retard bias. This combination maximizes the power output of the engine while protecting the engine from damage caused by excessive knock. The knock control algorithm advances spark by a calibratable time based rate. When knock is sensed the algorithm removes a calibratable amount of spark for each sensed knock event. Instead of disabling the knock sensors at high engine speed, the method keeps the control algorithm active. In this fashion, the method takes advantage of what the knock system "learned" at low engine speeds and applies that offset at high engine speeds. The theory behind this decision is that if, for example, 4 degrees of spark advance is removed at low engine speeds to avoid engine knock, approximately the same offset is appropriate at high engine speeds to avoid knock. This approach relies heavily on the knock system's ability to detect knock. Therefore, additional safety measures are incorporated to protect for variability in the knock control system. The first safety measure is a clip on the knock control system's authority to advance spark. This clip ensures that at high engine speeds the spark advance will never be greater than the optimal predetermined spark advance. The second safety measure is a time-based spark retardation bias. The amount of max retardation is calibratable as well as how fast the maximum retardation is ramped in. The ramp start and end times are calibratable as well.

Thus, while adaptive spark strategies have been incorporated in the past, these strategies apply a global adder to the scheduled spark advance. The global adder is incremented/decremented over a period of time using only the knock control system as input and feedback. In accordance with the present method, the offset learned by the knock control system is immediately applied and incorporates an additional time based spark retard bias to protect for variability.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
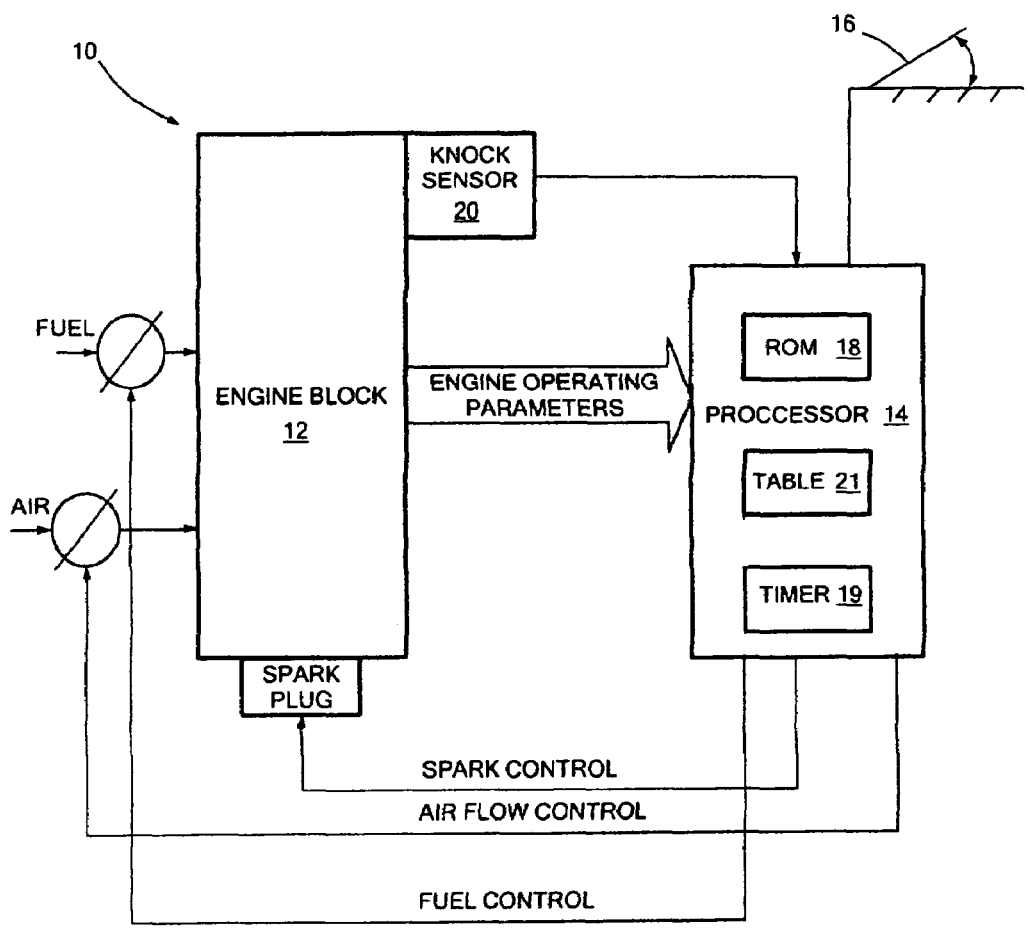
FIG. 1 is a block diagram of an internal combustion engine system according to the invention.

Referring now to FIG. 1, an internal combustion engine system 10 is shown to include an internal combustion engine block fed by air, fuel and spark, such air, fuel and spark being controlled by an engine control unit (i.e., processor) 14 in response to torque demanded by an operator of the system, such demanded torque being inputted to the processor 14 by a foot pedal 16 and engine operating parameters (e.g. engine speed, air temperature, engine load (i.e., cylinder air charge), EGR, VCT, coolant temperature, etc.) fed to the processor 14. The processor 14 includes a memory 18, here a ROM or other storage medium, for storing an executable program to produce air, fuel and sparking timing signals for the engine 12. The portion of the program used to control the spark will be described below in connection with the flow diagrams shown in FIGS. 2-5. Suffice it to say here, that the method includes determining, in response to a knock sensor 20 mounted to the engine 12, a spark offset to the scheduled spark timing for the engine 12 at relatively low engine speed which is applied to the scheduled spark timing at relatively high engine speeds which is additionally biased with a time-varying spark retardation term, $S_T$. The bias, $S_T$, increases if either a relatively large torque is demanded from the engine or the engine is at the relatively high speed and relatively high air charge condition; otherwise, the bias is decreased with time.

Figure 2:
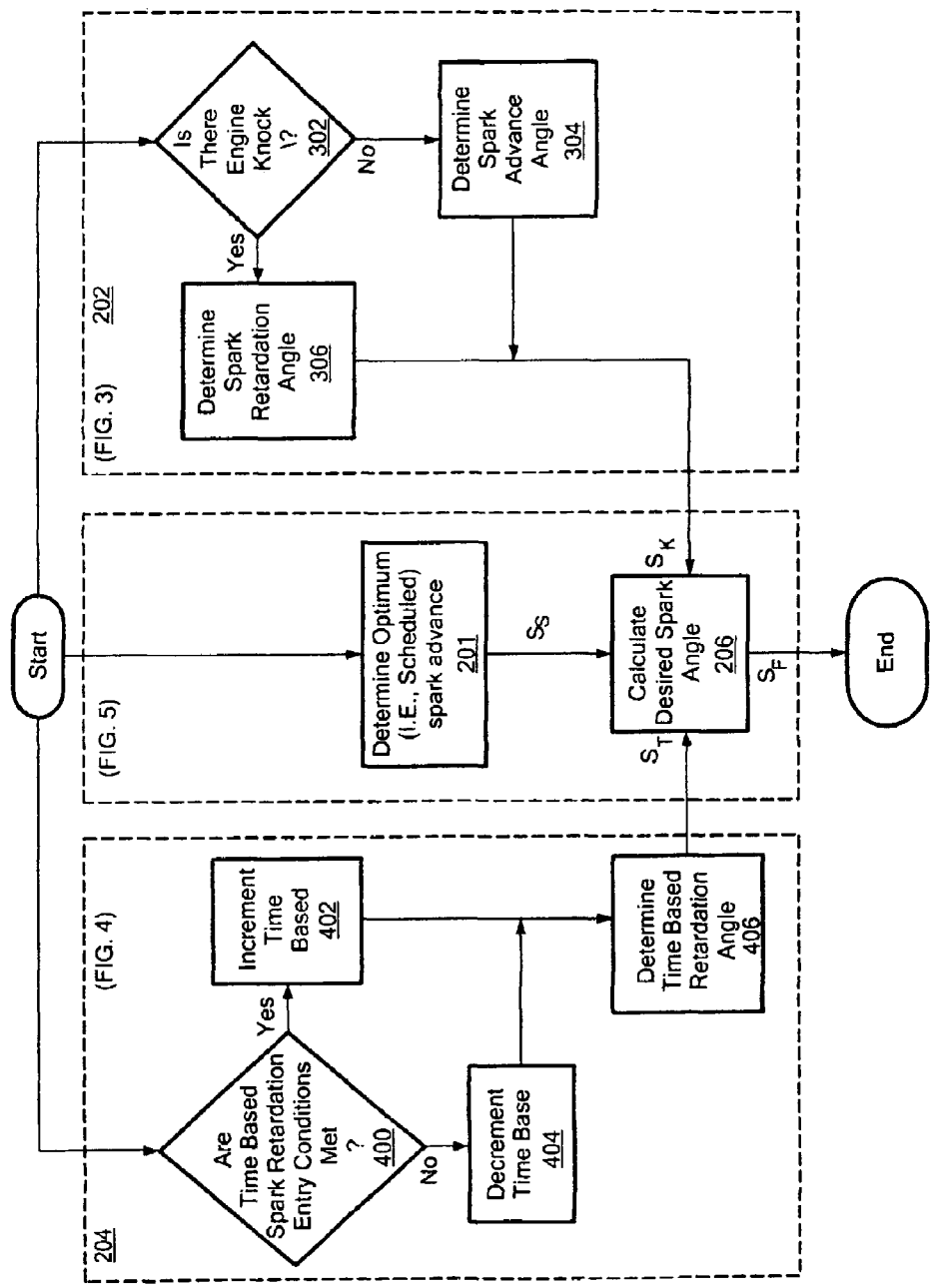
FIG. 2 is a flow diagram of a process used to determine spark angle for the engine of FIG. 1 in accordance with the invention.

Referring now to FIG. 2, the method determines a scheduled optimum predetermined spark advance term, $S_S$ using any conventional spark scheduling technique, Step 201 (FIG. 5) determines a knock spark retardation term, $S_K$, Step 202 (FIG. 3), which is added to the scheduled spark $S_S$ term and biases the result with a time based spark retardation term $S_T$, Step 204 (FIG. 4) to produce a final spark retardation term $S_F$, 406.

The knock spark retardation term, $S_K$, Step 202 is described in more detail in connection with FIG. 3. Suffice it to say here that the process determines from the knock sensor 20 (FIG. 1) whether there is a knock event, Step 302. If knock is not detected, the process advances the spark angle, Step 304; otherwise, the spark is retarded, Step 306.

The time based retardation term, $S_T$; Step 204 is described in more detail in connection with FIG. 4. Suffice it to say here that the process determines whether time based spark retardation conditions (if either a relatively large torque is demanded from the engine or the engine is at the relatively high speed and relatively high air charge condition) are met, Step 400. If they are met, a timer (e.g. counter) 19 in the processor 14 (FIG. 1) that maintains a term TMR is incremented, Step 402; otherwise, the timer 19 is decremented Step 404. Next, the time based spark retardation term, $S_T$ is computed, Step 406.

Figure 3:
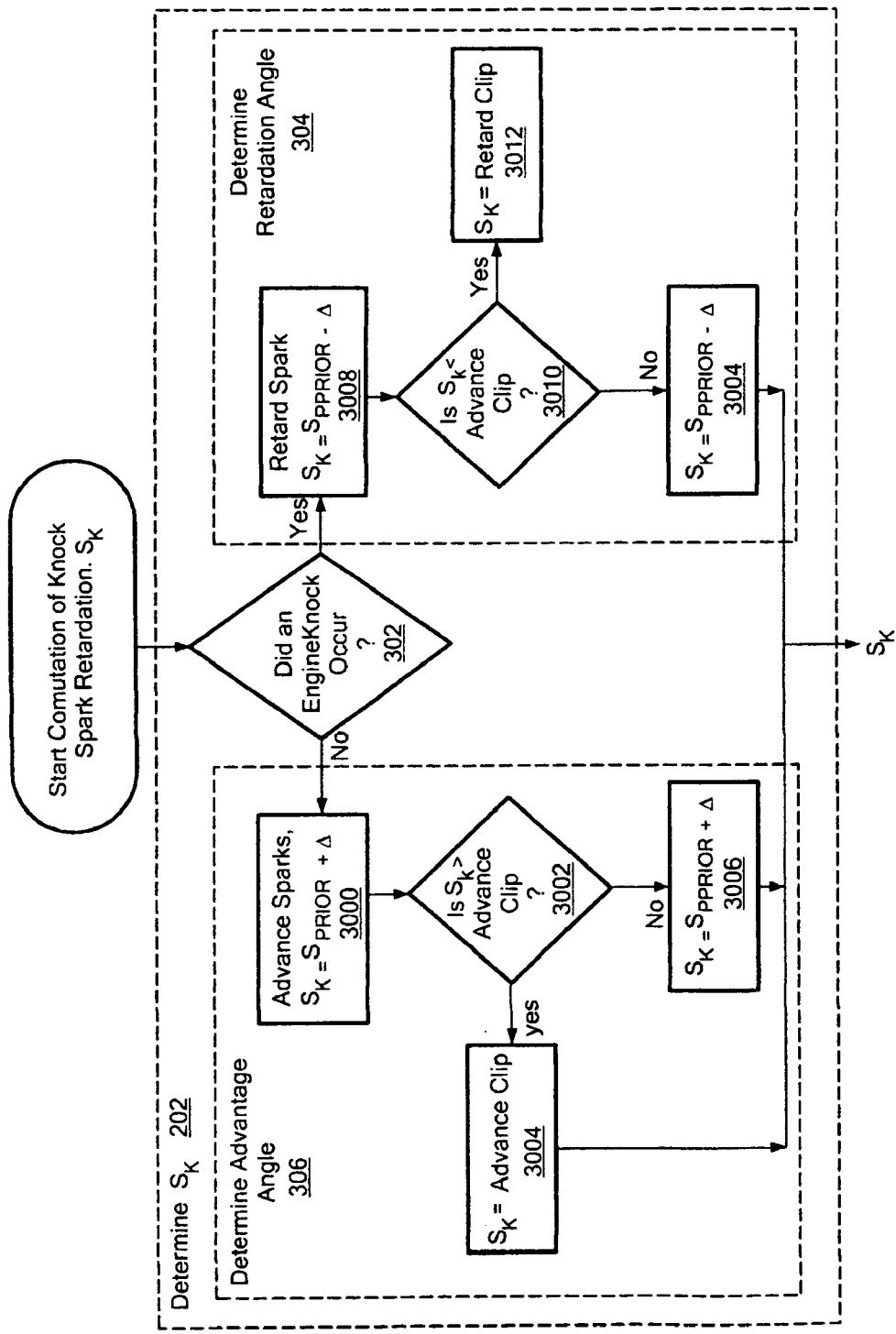
FIG. 3 is a flow diagram of a process used to a knock spark retardation term used in the process of FIG. 2.

Referring now to FIG. 3, the details of the computation of the knock spark retardation term, $S_K$, (Step 202), is shown to include in more details, Steps 302, 304 and 306. Thus, if an engine knock is not detected (Step 302), the process advances the spark, $S_K$, by incrementing the prior spark timing $S_{PRIOR}$, a predetermined incremental amount $\Delta$, i.e., $S_K = S_{PRIOR} + \Delta$, Step 3000. The process then determines where $S_K$ at a maximum predetermined level, i.e., clipped, Step 3002. If clipped, $S_K$=the maximum level, Step 3004; otherwise, $S_K = S_{PRIOR} + \Delta$, Step 3006.

On the other hand, if a knock is detected in Step 302, the process retards the spark, $S_K$, by incrementing the prior spark timing $S_{PRIOR}$, a predetermined incremental amount $\Delta$, i.e., $S_K = S_{PRIOR} - \Delta$, Step 3008. The process then determines where $S_K$ at a minimum predetermined level, i.e., clipped, Step 3010. If clipped, $S_K$=the minimum level, Step 3012; otherwise, $S_K=S_{PRIOR}-\Delta$, Step 3014.

Figure 4:
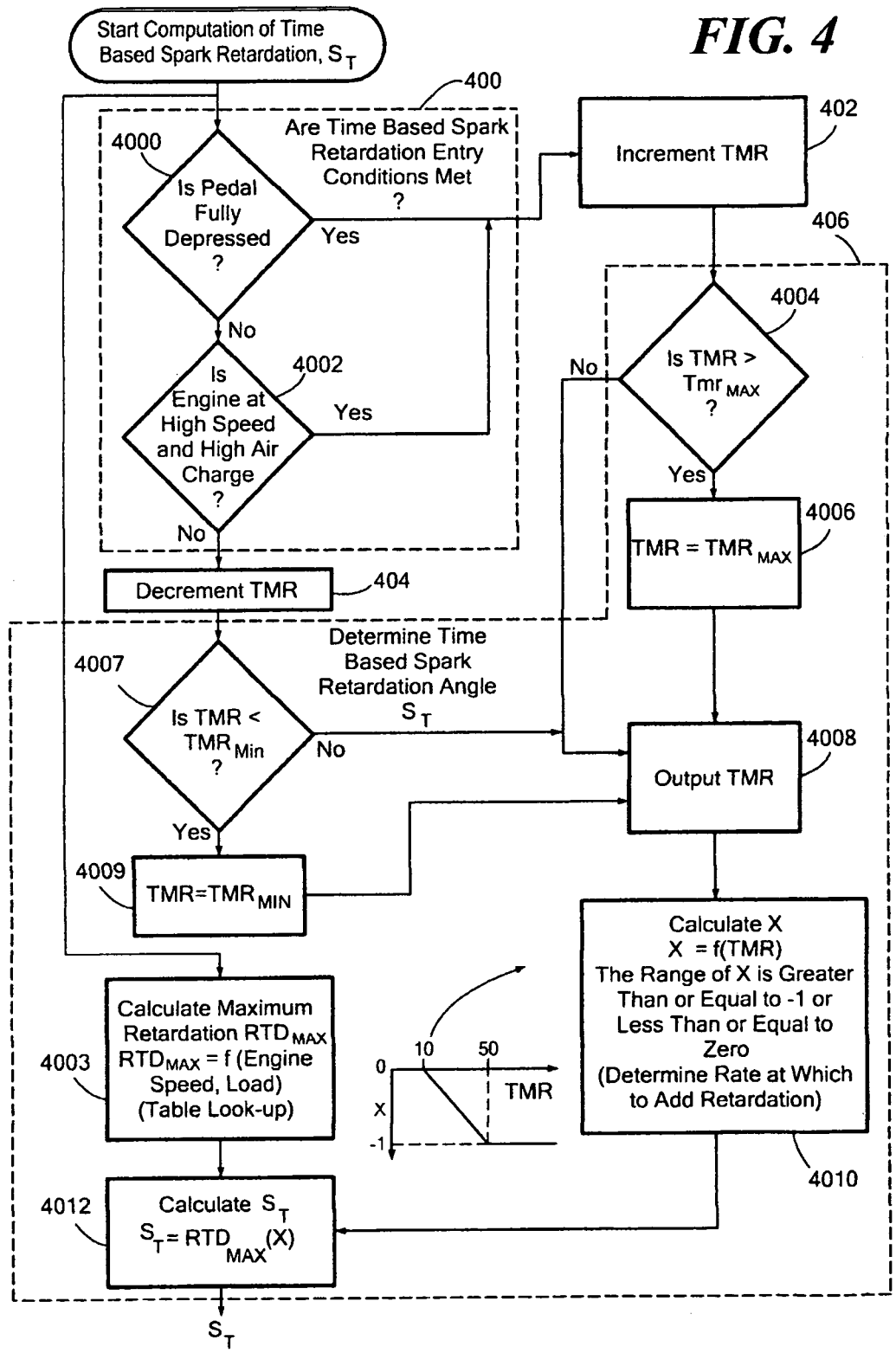
FIG. 4 is a flow diagram of a process used to a time based spark angle retardation term for the process of FIG. 2 in accordance with the invention.

Referring now to FIG. 4, the process (Step 204) for determining the time-based spark retardation term, $S_T$, is shown in more detail. As noted above, the process determines whether time based spark retardation conditions (if either a relatively large torque is demanded from the engine or the engine is at the relatively high speed and relatively high air charge condition) are met, Step 400. If they are met, the timer 19 in the processor 14 (FIG. 1) that maintains a term TMR is incremented, Step 402; otherwise, the timer 19 is decremented Step 404. Next, the time based spark retardation term, $S_T$ is computed, Step 406.

More particularly, in Step 400, the process determines whether the pedal 16 (FIG. 1) is fully depressed, Step 4000. If the pedal is fully depressed, the timer 19 (FIG. 1) is incremented (i.e., TMR is incremented), Step 402; otherwise, the process determines whether the engine is at a relatively high engine speed and at a relatively high air charge, Step 4002. If the engine is at a relatively high engine speed and at a relatively high air charge, the timer 19 (FIG. 1) is incremented (i.e., TMR is incremented), Step 402; otherwise, the timer 19 is decremented (i.e., TMR is decremented), Step 404.

It is noted that the process calculates a maximum retardation term $RTD_{MAX}$, Step 4003. The term $RTD_{MAX}$ is determined from engine testing and the term is stored in a look up table, not shown, in the processor 14 as a function of engine speed and engine air charge. Thus, from the actual engine operating speed and air charge, the process calculates the maximum retardation term $RTD_{MAX}$.

Next, the time-based spark retardation term, $S_T$ is computed, Step 406; such Step 405 being shown in more detail in FIG. 4 to include, determining from Step 402, if the TMR is greater than a predetermined value $TMR_{MAX}$, Step 4004. If it is, TMR is set equal to $TMR_{MAX}$ and such value is used to calculate a term X to be described in connection with Step 4010 Step 4008; otherwise, if the TMR has been decremented to a value less than a predetermined $TMR_{MIN}$, $TMR_{MIN}$ is used to determine X (Step 4009)

Thus, X is a function of TMR; where TMR is either $TMR_{MIN}$ if TMR has been decremented to $TMR_{MIN}$; $TMR_{MAX}$ if TMR has been incremented to $TMR_{MAX}$, or a value between $TMR_{MAX}$ and $TMR_{MIN}$ such value TMR being the contents of timer 19 (FIG. 1).

An example of X is as follows: X is the output of a table 1 (FIG. 1) in the processor 14, the input to the table below is the timer 19 (TMR). The table, for example, looks something like this:

TABLE 1

| 0 | 0 | 10 | 30 | 50 | INPUT, TMR |
|---|---|----|----|----|------------|
| 0 | 0 | 0  | −1 | −1 | OUTPUT, X  |

So, in this example when the timer 19 is 5, X=0. When the timer 19 is 10, X=0 and when the timer 19 is 30, X=−1. The output will linearly interpolate between the values in the table. So when the timer 19 is 20, X=−0.5.

In Step 4012, the time based spark angle retardation term $S_T$ is calculated as: $ST=RTD_{MAX}$, from Step 4003, times X; i.e., $S_T=RTD_{MAX}*X$.

Figure 5:
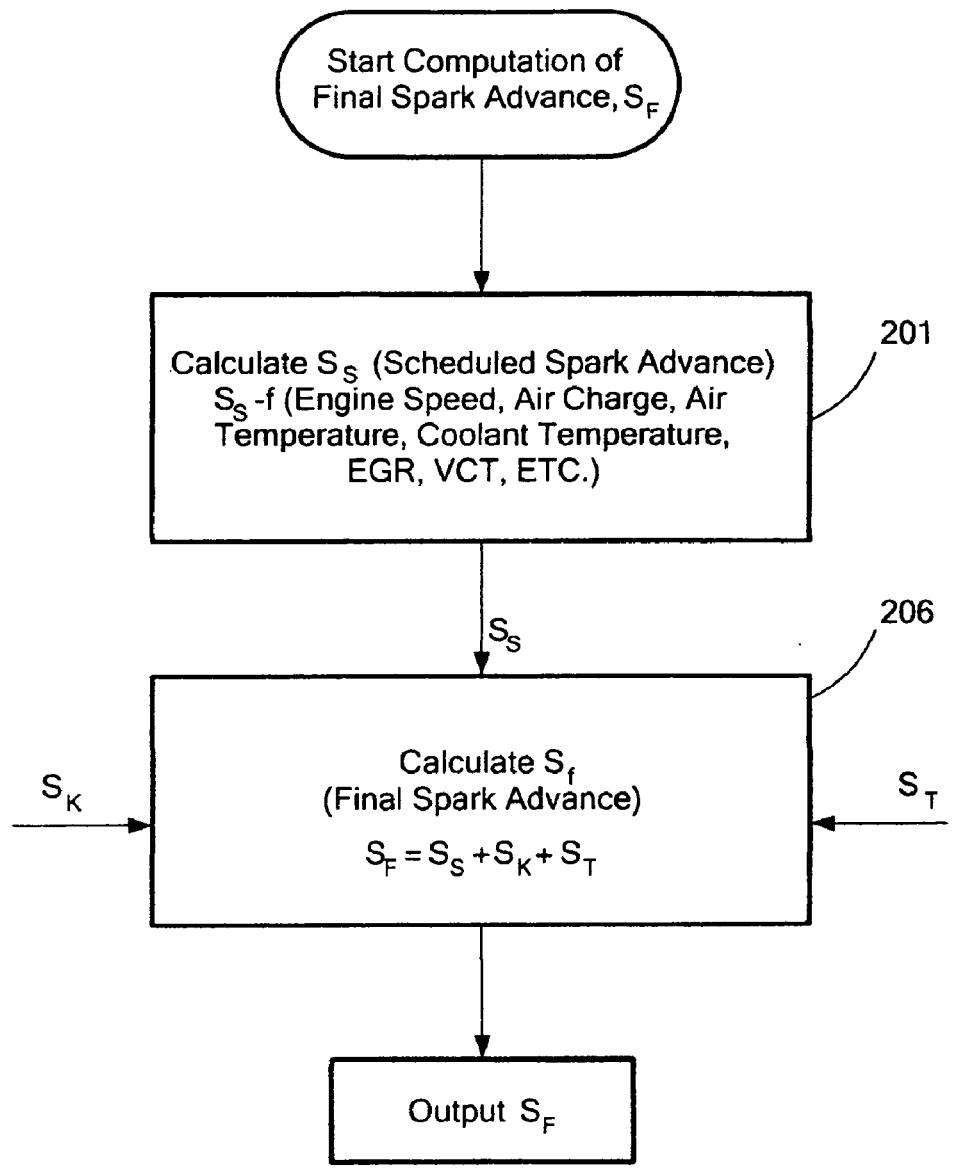
FIG. 5 is a flow diagram of a process used to calculate spark angle for the engine of FIG. 1 in accordance with the invention.

Referring now to FIG. 5, the process used to calculate of the final spark retardation term $S_F$ is shown. As noted above, in Step 201, the scheduled spark advance term, $S_S$ using any conventional spark scheduling technique, Step 201 (FIG. 5), such being a function of engine operating parameters: engine speed, air temperature, air charge, EGR, VCT, coolant temperature, etc. is fed to the processor 14. The final spark advance is calculated by adding $S_K$, from Step 202 (FIG. 3), $S_S$, from Step 201, and $S_T$, from Step 406 (FIG. 4), thus $S_F=S_K+S_S+S_T$, Step 206.

A number of embodiments of the invention have been described. Nevertheless, it will be understood that various modifications may be made without departing from the spirit and scope of the invention. Accordingly, other embodiments are within the scope of the following claims.

What is claimed is:

1. A method for controlling spark timing in an internal combustion engine, comprising:

determining, in response to a knock sensor mounted to the engine operating at a relatively low engine speeds, a spark offset from a scheduled spark timing;

applying the spark offset at relatively high engine speeds; and incorporating an additional time based spark bias to the scheduled spark timing.

2. The method recited in claim 1 wherein the additional time based spark bias increases if either a relatively large torque is demanded from the engine or the engine is at the relatively high speed and relatively high air charge condition; otherwise, the bias is decreased with time.

3. The method recited in claim 1 wherein the offset applied at relatively high engine speed is incremented at a rate proportional to the time based spark bias.

4. A method for controlling spark timing in an internal combustion engine, comprising:

determining, in response to a knock sensor mounted to the engine, spark timing for the engine at relatively low engine speed; and biasing the determined spark timing at relatively high engine speeds with a time-varying spark retardation term.

* * * * *